(12) United States Patent
Huang

(10) Patent No.: US 8,699,221 B2
(45) Date of Patent: Apr. 15, 2014

(54) NOTEBOOK COMPUTER COOLING PAD CAPABLE OF TEMPERATURE DETECTION AND FAN-SPEED ADJUSTMENT

(76) Inventor: Cheng Yu Huang, Taipei (TW)

(*) Notice: Subject to any disclaimer, the term of this patent is extended or adjusted under 35 U.S.C. 154(b) by 202 days.

(21) Appl. No.: 13/415,975

(22) Filed: Mar. 9, 2012

(65) Prior Publication Data
US 2013/0235520 A1 Sep. 12, 2013

(51) Int. Cl.
*H05K 5/00* (2006.01)
(52) U.S. Cl.
USPC . 361/679.49; 361/695; 361/702; 361/679.46; 361/679.48; 248/346.01; 165/120
(58) Field of Classification Search
USPC ............ 361/679.46, 679.48, 695, 679.49; 248/346.01; 165/120
See application file for complete search history.

(56) References Cited

U.S. PATENT DOCUMENTS

| | | | |
|---|---|---|---|
| 6,754,072 B2* | 6/2004 | Becker et al. ............ | 361/679.48 |
| 8,035,971 B2* | 10/2011 | Sween et al. ................ | 361/695 |
| 8,582,296 B2* | 11/2013 | Huang ......................... | 361/695 |
| 2005/0174731 A1* | 8/2005 | Lin ............................... | 361/686 |
| 2006/0164753 A1* | 7/2006 | Huang ....................... | 360/97.02 |
| 2006/0164806 A1* | 7/2006 | Huang .......................... | 361/691 |
| 2007/0091560 A1* | 4/2007 | Parker ........................... | 361/687 |
| 2010/0214737 A1* | 8/2010 | Huang ....................... | 361/679.48 |
| 2010/0219729 A1* | 9/2010 | Huang ...................... | 312/330.1 |
| 2011/0013358 A1* | 1/2011 | Huang ..................... | 361/679.48 |
| 2011/0026218 A1* | 2/2011 | Mahalingam et al. ... | 361/679.46 |
| 2011/0235269 A1* | 9/2011 | Zhou et al. ............... | 361/679.48 |

* cited by examiner

*Primary Examiner* — David M Sinclair
*Assistant Examiner* — Robert Brown
(74) *Attorney, Agent, or Firm* — Jackson IPG PLLC

(57) ABSTRACT

A notebook computer cooling pad capable of temperature detection and fan-speed adjustment is equipped with heat-dissipating fans, a control panel and plural movably deposited temperature sensors, so that when a notebook computer is placed on the notebook computer cooling pad, a user may be informed of real-time temperature readings related to different locations of the notebook computer and use the use the fan-speed adjusting button to adjust a rotational speed of the heat-dissipating fans.

5 Claims, 3 Drawing Sheets

NOTEBOOK COMPUTER COOLING PAD CAPABLE OF TEMPERATURE DETECTION AND FAN-SPEED ADJUSTMENT

BACKGROUND OF THE INVENTION

1. Technical Field

The present invention relates to cooling pads for computers, and more particularly, to a notebook computer cooling pad capable of temperature detection and fan-speed adjustment, wherein the notebook computer cooling pad is equipped with a control panel for a user to monitor the temperature of a notebook computer placed on the notebook computer cooling pad and to adjust the rotational speed of heat-dissipating fans installed in the notebook computer cooling pad.

2. Description of Related Art

Notebook computers are made to be portable and can work with the increasingly available wireless network connection for convenient use virtually everywhere. With the effort of engineers working in the art, notebook computers have recently been developed toward the tendency of lightweight, compact size and long battery life that further support their portability. With the increasingly widespread availability of wireless internet services, notebook computers can be brought and used anytime and everywhere, and thus are widely welcome by computer users.

Since compactness is usually the top priority of notebook computer design, it is known that notebook computers have much less heat-dissipating efficiency as compared to desktop computers and server computers. Conventionally, a notebook computer has its hard drive, CPU and power supply located near its back, so the back tends to heat up. Damages caused by the consequent heat accumulating effect are common.

For protecting a notebook computer from heat accumulation, various cooling pads of different materials, sizes and forms have been introduced to the market for supporting notebook computers while facilitating their heat dissipation. For achieving better heat-dissipating efficiency, some of the existing cooling pads are equipped with heat-dissipating fans that generate airflow to take away heat generated by notebook computers.

However, the traditional cooling pads, with or without heat-dissipating fans, lack mechanisms for detecting the temperature of the notebook computers thereon so users thereof may fail to solve heat accumulation timely and suffer data loss or mechanical failure. Hence, there is still room for improvement of the existing notebook computer cooling pads.

SUMMARY OF THE INVENTION

In view of the incapability of the traditional notebook computer cooling pads in temperature monitoring, the present inventor has developed a notebook computer cooling pad capable of temperature detection and fan-speed adjustment. In one embodiment of the present invention, a notebook computer cooling pad is equipped with heat-dissipating fans, a control panel, a temperature displaying member and a fan-speed adjusting button, plus plural movably deposited temperature sensors, so that when a notebook computer is placed on the notebook computer cooling pad, a user may be informed of real-time temperature readings related to different locations of the notebook computer and use the fan-speed adjusting button to adjust the rotational speed of the heat-dissipating fans.

According to the present invention, the control panel, the temperature sensors, a USB expansion card and the heat-dissipating fans are electrically connected to a motherboard through power cords, so that the control panel can display temperatures sensed by the temperature sensors and allow a user's adjustment of the rotational speed of the heat-dissipating fans accordingly, thereby ensuring good and timely heat dissipation of the notebook computer.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein:

FIG. 6 illustrates electrical connection among components of the notebook computer cooling pad according to the present invention; and.

DETAILED DESCRIPTION OF THE INVENTION

Figure 1:
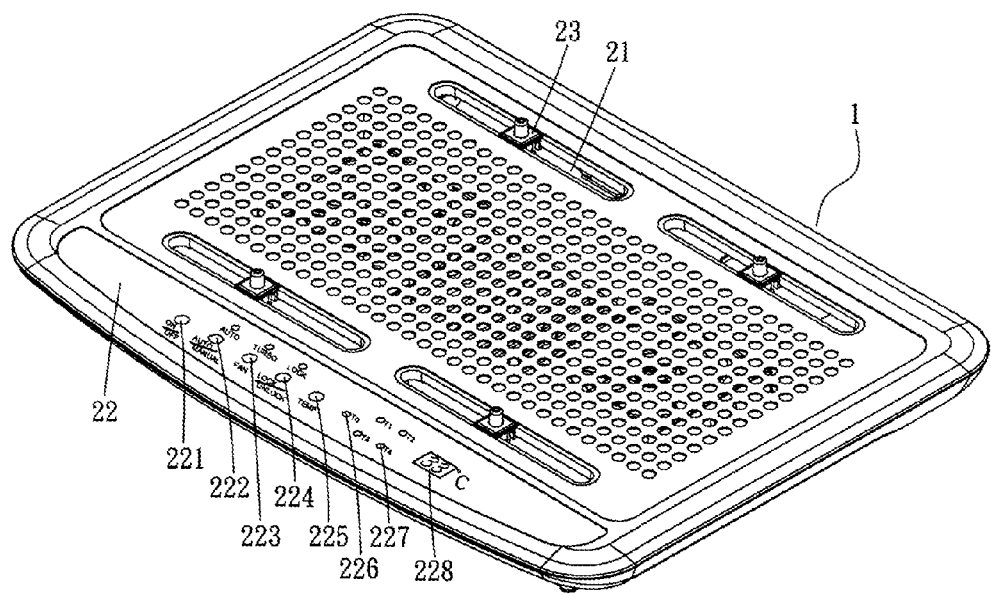
FIG. 1 is a perspective view of a notebook computer cooling pad according to the present invention.
Figure 3:
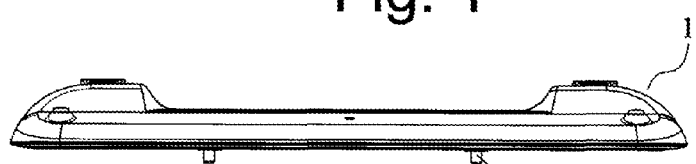
FIG. 3 is a back view of the notebook computer cooling pad according to the present invention.
Figure 2:
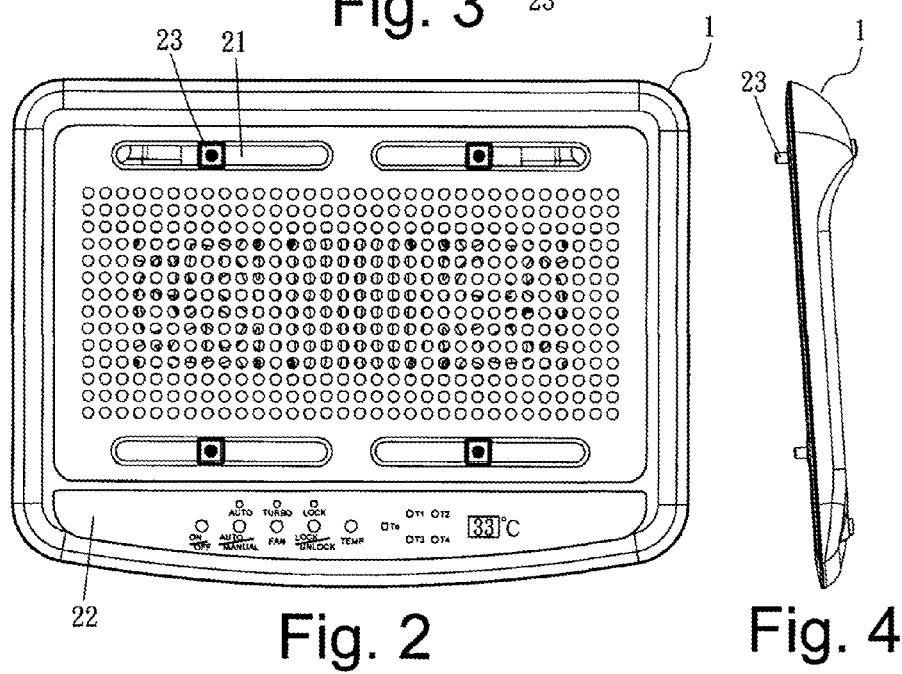
FIG. 2 is a top view of the notebook computer cooling pad according to the present invention.
Figure 4:
FIG. 4 is a lateral view of the notebook computer cooling pad according to the present invention.
Figure 5:
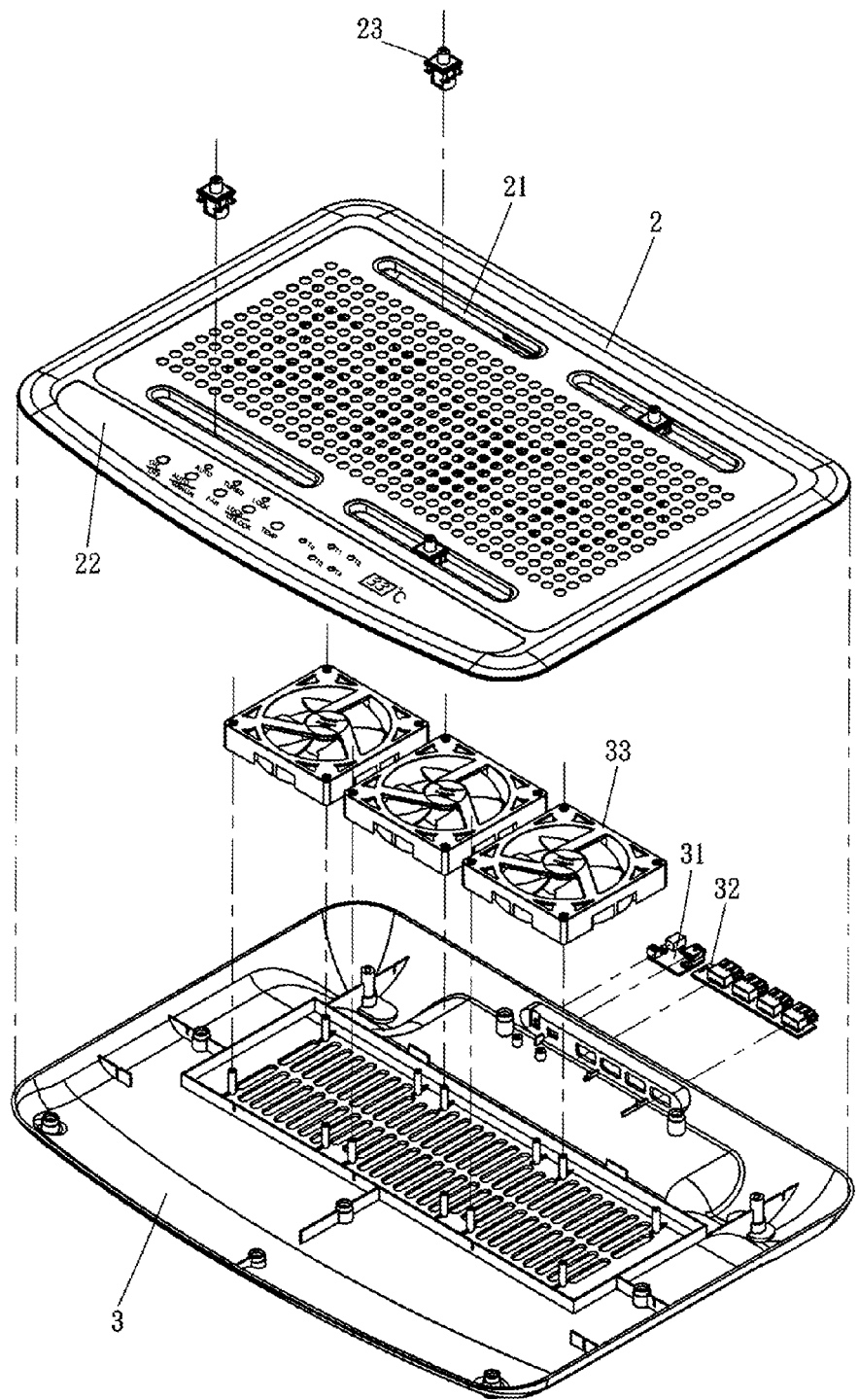
FIG. 5 is an exploded view of the notebook computer cooling pad according to the present invention.

Referring to FIG. 1 through FIG. 5, a notebook computer cooling pad 1 of the present invention is structurally composed of an upper housing half 2 and a lower housing half 3.

The upper housing half 2 has a plurality of sliding grooves 21 and a control panel 22. Each of the sliding grooves 21 movably receives a temperature sensor 23 so that the temperature sensor 23 is allowed to slide along and get positioned within the sliding groove 21. The control panel 22 is provided with an on/off switch 221, an auto/manual fan control switch 222, a fan-speed adjusting button 223, a locking/unlocking button 224, a display-switching button 225, an ambient temperature indication lamp 226, temperature sensor indication lamps 227 and an ambient/sensor temperature displaying member 228.

The lower housing half 3 receives therein a motherboard 31, a USB expansion card 32 and a plurality of heat-dissipating fans 33. The motherboard 31 includes a control circuit, a DC input terminal 311 and a USB input terminal 312. The USB expansion card 32 has a plurality of USB expansion ports 321.

Figure 6:
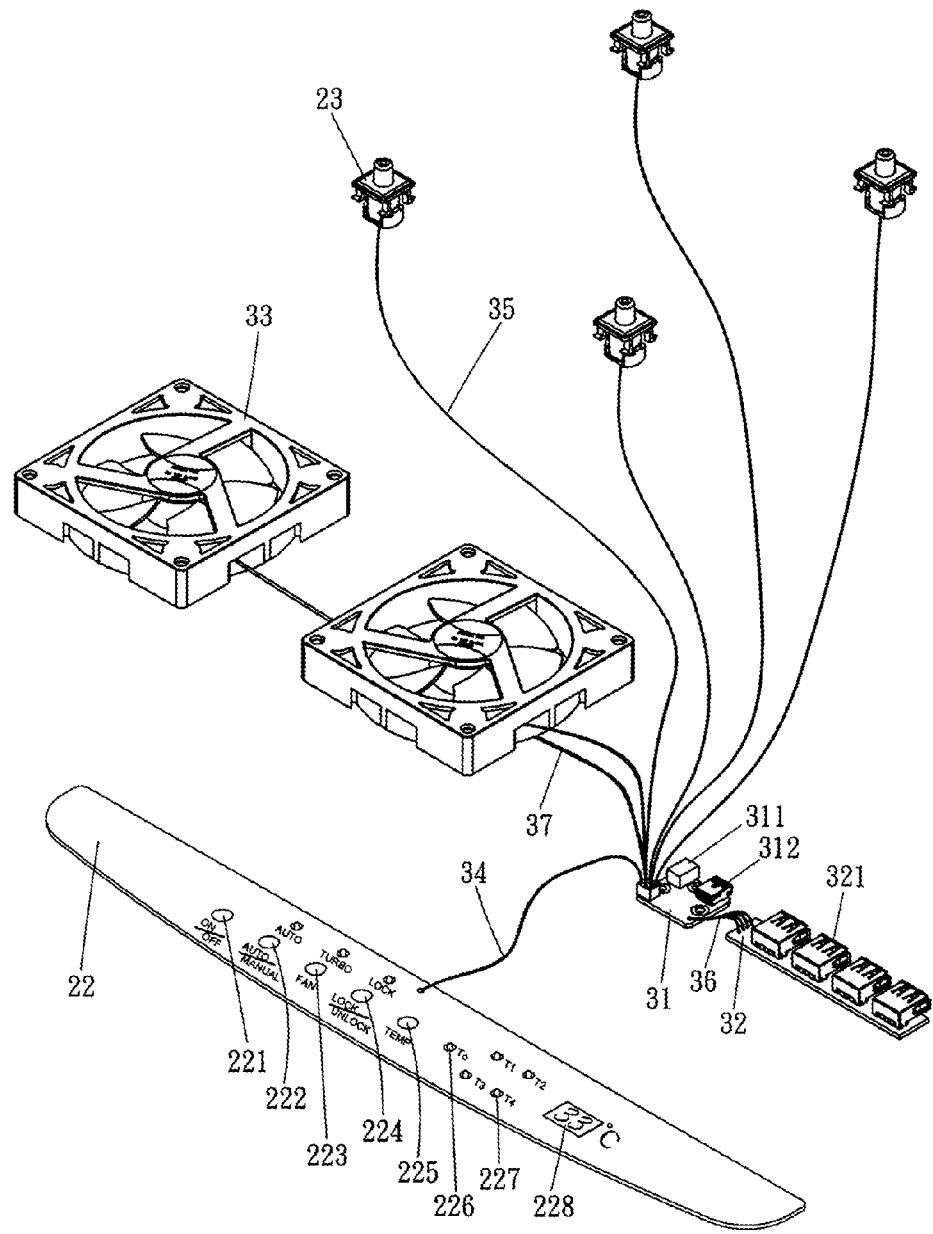

As shown in FIG. 6, the control panel 22, the temperature sensors 23, the USB expansion card 32 and the heat-dissipating fans 33 are electrically connected to the motherboard 31 through power cords 34, 35, 36 and 37.

The following description will be directed to the functions of the control panel 22. The on/off switch 221 is operable to turn on or off power supplied to the motherboard 31. The auto/manual fan control switch 222 is operable to selectively set the heat-dissipating fans 33 to operate according to a preset program or to be managed manually by a user in terms of a rotational speed of the heat-dissipating fans 33. As to the case of the preset program, for example, a threshold of 45° C. may be preset in the notebook computer cooling pad 1 before the notebook computer cooling pad 1 leaves the factory. Thus, when the auto/manual fan control switch 222 is operated to make the heat-dissipating fans 33 operate according to the preset program, and when any of the temperature sensors 23 senses a temperature higher than the preset threshold 45° C., the heat-dissipating fans 33 are automatically switched to operate with a high speed. On the contrary, when any of the temperature sensors 23 senses a temperature lower than the preset threshold 45° C., the heat-dissipating fans 33 are automatically switched to low-speed operation. On the other hand, in the case that the auto/manual fan control switch 222 is operated to allow a user to manage the heat-dissipating fans 33 manually, the user can freely use the fan-speed adjusting button 223 to control the rotational speed of the heat-dissipating fans 33. The locking/unlocking button 224 is such configured that when it is on, all the buttons on the control panel 22 are operable normally, and when it is off, all the buttons are locked and not operable. The display-switching button 225 is operable to switch the ambient/sensor temperature displaying member 228 to display the temperature related to the ambient temperature indication lamp 226 (T0) or related to one of the temperature sensor indication lamps 227 (T1, T2, T3, T4).

Figure 7:
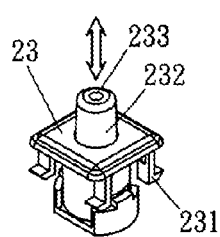
FIG. 7 is an enlarged view of a temperature sensor used in the notebook computer cooling pad according to the present invention.

As shown in FIG. 7, each of the temperature sensors 23 has two sides thereof provided with hooks 231 that help to retain the temperature sensor 23 within the corresponding sliding groove 21 formed on the upper housing half 2, so that the temperature sensor 23 is allowed to slide along and get positioned within the sliding groove 21. In addition, the temperature sensor 23 has a vertically resilient, extendable post 232 and a sensing head 233 mounted atop the extendable post 232, so that the sensing head 233 can properly contact and thereby read the temperature of a certain location at the back of the notebook computer placed on the notebook computer cooling pad 1.

With the foregoing configuration, the disclosed cooling pad is capable of monitoring temperatures at different locations of the notebook computer placed thereon and adjusting the rotational speed of the heat-dissipating fans accordingly, thereby ensuring that the notebook computer in use is appropriately cool and preventing damage caused by over heat.

What is claimed is:

1. A notebook computer cooling pad capable of temperature detection and fan-speed adjustment, the notebook computer cooling pad being composed of an upper housing half and a lower housing half;

the upper housing half having a plurality of sliding grooves and a control panel, each of the sliding grooves movably receiving a temperature sensor, so that the temperature sensor is allowed to slide along and get positioned within the sliding groove, and the control panel being provided with a plurality of operational buttons, indication lamps and a temperature displaying member; and the lower housing half receiving therein a motherboard, a USB expansion card and a plurality of heat-dissipating fans, the motherboard including a control circuit, a DC input terminal and a USB input terminal, and the USB expansion card having a plurality of USB expansion ports.

2. The notebook computer cooling pad of claim 1, wherein the operational buttons, the indication lamps and the temperature displaying member provided on the control panel include an on/off switch, an auto/manual fan control switch, a fan-speed adjusting button, a locking/unlocking button, a display-switching button, an ambient temperature indication lamp, a plurality of temperature sensor indication lamps and an ambient/sensor temperature displaying member.

3. The notebook computer cooling pad of claim 1, wherein the control panel, the temperature sensors, the USB expansion card and the heat-dissipating fans are electrically connected to the motherboard through power cords.

4. The notebook computer cooling pad of claim 2, wherein the on/off switch is operable to turn on or off power supplied to the motherboard;

the auto/manual fan control switch is operable to selectively set the heat-dissipating fans to operate according to a preset program or to be managed manually by a user in terms of a rotational speed of the heat-dissipating fans.

5. The notebook computer cooling pad of claim 1, wherein each of the temperature sensors has two sides thereof provided with hooks that help to retain the temperature sensor within the corresponding sliding groove formed on the upper housing half, so that the temperature sensor is allowed to slide along and get positioned within the sliding groove, and the temperature sensor has a vertically resilient, extendable post and a sensing head mounted atop the extendable post, so that the sensing head can properly contact and thereby read the temperature of a certain location at a back of a notebook computer placed on the notebook computer cooling pad.

\* \* \* \* \*